United States Patent [19]
Paulhamus

[11] Patent Number: 5,277,151
[45] Date of Patent: Jan. 11, 1994

[54] INTEGRAL WATER-COOLED CIRCULATING FLUIDIZED BED BOILER SYSTEM

[75] Inventor: Kent L. Paulhamus, Linden, Pa.

[73] Assignee: Tampella Power Corporation, Williamsport, Pa.

[21] Appl. No.: 5,574

[22] Filed: Jan. 19, 1993

[51] Int. Cl.⁵ .................................. F22B 1/00
[52] U.S. Cl. .................... 122/4 D; 110/245; 165/104.16; 422/146
[58] Field of Search .......... 110/245; 122/4D; 165/104.16; 422/146

[56] References Cited

U.S. PATENT DOCUMENTS

| | | | |
|---|---|---|---|
| 4,301,771 | 11/1981 | Jukkola et al. | 122/4 D |
| 4,546,709 | 10/1985 | Astrom | 110/216 |
| 4,708,092 | 11/1987 | Engström | 122/4 D |
| 4,732,113 | 3/1988 | Engstrom | 122/4 D |
| 4,755,134 | 7/1988 | Engström et al. | 122/4 D X |
| 5,070,822 | 12/1991 | Kinni et al. | 122/4 D |
| 5,117,770 | 6/1992 | Hassinen | 110/245 |
| 5,171,542 | 12/1992 | Sarkomaa | 422/146 |
| 5,181,481 | 1/1993 | Dietz | 122/4 D |

Primary Examiner—Edward G. Favors
Attorney, Agent, or Firm—Ohlandt, Greeley & Ruggiero

[57] ABSTRACT

An integral circulating fluidized bed steam generation system having a particle separator which is formed by the membrane walls of the reactor chamber. The particle separator has a serpentine configuration which includes a first turn which is capable of causing the solid particles in the flue gas to move toward the rear membrane wall and a second turn which is capable of causing smaller sized solid particles and the flue gas to be disposed between the front membrane wall and the larger sized solid particles wherein the flue gas passes through the solid particles to a discharge conduit which is disposed within the rear membrane wall and wherein the smaller sized solid particles are retained between the front membrane wall and the larger sized solid particles. The particle separator also includes a means for recycling the solid particles from the particle separator to the reactor chamber.

32 Claims, 4 Drawing Sheets

INTEGRAL WATER-COOLED CIRCULATING FLUIDIZED BED BOILER SYSTEM

The present invention generally relates to the burning of carbonaceous materials, such as coal, wood, petroleum coke and other solid combustibles, in a circulating fluidized bed having heat exchangers disposed therein for the generation of steam. This integral water-cooled circulating fluidized bed boiler system includes a reaction chamber, solids separation device and solids re-injection system all contained within one combustor reactor.

BACKGROUND OF THE INVENTION

The use of circulating fluidized bed systems for burning carbonaceous materials to generate steam from heat exchangers disposed within fluidizing reactors is well documented throughout the literature.

Circulating fluidized bed systems involve a two phase gas-solids process which promotes solids entrainment within the upflowing gas stream in the reactor chamber and then recycles the solids back into the reactor chamber with a high rate of solids circulation. The rate of solids circulation in the circulating fluidized bed process is about fifty times that of a bubbling bed process. Circulating fluidized bed systems differ from bubbling bed systems in that they typically employ air to move the fuel in a circulating path as it combusts which increases turbulence, residence time, and a higher bed temperature in contact with the heat absorbing surfaces throughout the combustor system, thus increasing carbon combustion efficiency, increasing heat transfer throughout the system and decreasing carbon monoxide emission levels.

Various examples of known circulating fluidized bed systems are described in U.S. Pat. Nos. 4,165,717 (Reh et al.) and 3,625,164 (Spector), and an article by A.M. Leon and D.E. McCoy, presented at the First International Conference on Circulating Fluidized Beds, Halifax, Nova Scotia, Canada (Nov. 18-20, 1985), and entitled "Archer Daniels Midland Conversion to Coal."

Common to all circulating fluidized bed systems is the need for a fluidized bed reaction chamber or combustor, a solids separation unit and a solids re-injection unit. All of the circulating fluidized bed systems disclosed in the above patents and article have particle separators (i.e., cyclones) and solids re-injection units (i.e., FluoSeals®) which are disposed external of the reaction chamber.

In most conventional systems the combustor, particle separator and solids re-injection unit are supported independently. Thus, requiring their own structural support systems, refractory protected flue gas ducts with expansion joints and in some designs separate water-cooled or steam-cooled systems with their own supply and relief piping.

Still other have attempted to provide a combustor reactor having a particle separator disposed within the reactor chamber. Some examples of these integral combustor/separator systems are shown in U.S. Pat. No. 4,546,709 (Aström), which issued on Oct. 15, 1985, U.S. Pat. No. 4,301,771 (Jukkola et al.), which issued on Nov. 24, 1981, U.S. Pat. No. 5,117,770 (Hassinen), which issued on Jun. 2, 1992, and U.S. Pat. No. 5,070,822 (Kinni et al.), which issued on Dec. 10, 1991.

The Aström patent discloses a reaction chamber with a fluidized bed and a cyclone separator disposed within the reaction chamber in order to attain a high degree of separation, which is desirable if the gases are to pass through a turbine.

The Jukkola et al. patent discloses a fluidized heat exchanger which comprises a housing, a reaction chamber and a convection heat exchange chamber above the reaction chamber. The convection heat exchange chamber is separated from the reaction chamber by a slanted baffle. The baffle defines a gas passageway between the reaction chamber and the convection heat exchange chamber. At the bottom of the baffle is a hopper portion wherein dust is collected and removed from gases passing through the convection heat exchange chamber.

The Kinni et al. and Hassinen patents each disclose a reactor chamber having a particle separator disposed therein. The particle separator has an outer casing and an inner casing. These casings both have a circular horizontal cross-section and center lines which are arranged essentially to coincide with the center line of the reactor chamber.

The Aström, Kinni et al. and Hassinen patents each require that an independent particle separator unit be built and installed within the reaction chamber. This is extremely costly, technically difficult to install and extremely difficult to service.

The baffle design of Jukkola et al. relies solely upon gravity for particle separation of large particles, but does not provide sufficient means for separating fine particles from the flue gases. That is, the combustion gases exiting the combustion chamber have entrained therein a substantial amount of dust. In traversing the convection chamber the larger particles of unburned fuel, ash and limestone drop out and are collected by the hopper. These particles slide down the inclined surfaces of the baffle and hopper into the ash conduit for recycling into the fluidized bed. The gases leaving the reactor vessel through the exhaust gas conduit will have entrained therein a substantially reduced amount of fine dust but it may be desirable to provide a cyclone external to the reaction vessel to capture these fine solids and return them to the fluidized bed through a cyclone return conduit. Therefore, the slanted baffle of Jukkola et al. does not remove sufficient amounts of fine particles to avoid the need altogether of an externally disposed cyclone or particle separator. Moreover, the fluidized bed boiler of Jukkola et al. is directed primarily to a bubbling bed system rather than to a circulating fluidized bed system and is not concerned with the recycling of a substantial portion of entrained solid particles since it does not generate nearly as much entrained solid particles as normally associated with a circulating fluidized bed system.

The present invention is directed to a circulating fluidized bed boiler system which is a single integrated or integral fluidized bed reactor, solids separation unit and solids re-injection unit. These three normally separate and independent components are combined into a single integral system within the water-cooled combustor system. The present inventor has discovered that incorporating these components into a single integral system simplifies the structural support and eliminates the high maintenance refractory lined breeching with expansion joints.

The integral circulating fluidized bed boiler system according to the present invention also provides the following advantages over conventional multiple component systems: (1) lessens the complicated structural supports for the various units, (2) eliminates expansion and sealing problems between the reactor and particle separator and between the solids re-injection unit and the reactor, (3) reduces the cost of manufacturing and field construction, (4) reduces the required plan area thus saving real estate costs, (5) provides a larger range of boiler applications, (6) reduces maintenance costs and requires that fewer replacement parts be stocked, and (7) simplifies the exterior maintenance platforms and walkways.

Also, the unique arrangement of the system of the present invention allows the conventional back-pass convection superheater/economizer unit to be incorporated into the water-cooled membrane enclosure thus providing one uniformly expanding singularly supported piece of equipment.

The present invention also provides many additional advantages which shall become apparent as described below.

SUMMARY OF THE INVENTION

An integral circulating fluidized bed steam generation system which includes a reactor chamber, heat exchange means for the circulation of a coolant disposed substantially throughout the reactor chamber, wherein at least a portion of the reactor chamber includes at least one sidewall formed by a first wall and a second wall, a first discharge conduit disposed near the top of the reactor chamber for the discharge of flue gas having entrained solid particles, a particle separator connected to the first discharge conduit for separating the solid particles entrained within the discharged flue gas, and means for recycling the solid particles from the particle separator to the reactor chamber.

The particle separator is formed by the first and second walls and has a serpentine configuration. This serpentine configuration includes at least a first turn and a second turn. The first turn causes the solid particles in the discharged flue gas to move toward the second wall. The second turn causes the smaller sized solid particles and the discharged flue gas to be disposed between the first wall and the larger sized solid particles. Moreover, centrifugal forces and gravity cause the flue gas to pass through the stratified solid particles after the second turn and into a second discharge conduit which is disposed within the second wall while the smaller sized solid particles are retained between the first wall and the larger sized solid particles.

The smaller sized solid particles are retained between the first wall and the larger sized solid particles due to the stratification of the large solid particles near the second discharge conduit which is caused by gravity and the centrifugal forces about the second turn.

The means for recycling the solid particles comprises at least one chute connected to the particle separator downstream of the second discharge conduit and at least one re-injection means. Each chute comprises at least one primary compartment or hopper in its upper region and at least two secondary compartments in its lower region. The hopper is preferably formed by bending the tubes of the first and second wall inward to created mutually opposing sloped walls. The hopper is preferably since it increases the overall heat transfer of the system.

The re-injection means comprises a center chamber or chute which is in communication with at least one secondary compartment, a first outer chamber having a first reinjection discharge conduit disposed between the first outer chamber and the reactor chamber, a second outer chamber having second re-injection discharge conduit disposed between the second outer chamber and the reactor chamber, a first conduit disposed between the inner chamber and the first outer chamber, a second conduit disposed between the inner chamber and the second outer chamber, and a means for fluidizing the solid particles in the re-injection means such that the solid particles move from the inner chamber through the first and second conduits to the first and second outer chambers, respectively, and then from the first and second outer chambers through the first and second reinjection discharge conduits, respectively, to the reactor chamber.

This integral system further comprises a discharge chamber which is in communication with the second discharge conduit. The discharge chamber is capable of reducing the velocity of the discharged flue gas wherein additional fines are recycled to the particle separator.

In addition, it is preferable to add a superheater/economizer unit downstream of the discharge conduit of the particle separator. The superheater/economizer unit is preferably formed from the heat exchange means of the reactor chamber, thereby providing a uniformly expanding integral system. Fines from the superheater/economizer unit ar thereafter collected and returned to either the particle separator or reactor chamber by means of a secondary solids separation system.

A process for burning carbonaceous material to generate steam which comprises the following steps: introducing carbonaceous material to the lower portion of a fluid bed reactor chamber; fluidizing the carbonaceous material with a primary fluidizing gas, e.g., air, introduced at the bottom the reactor chamber and a secondary gas introduced into the reactor chamber at a level above the primary fluidizing gas; burning the carbonaceous material in the reactor chamber; discharging flue gas with entrained solid particles in combustion to a water-cooled particle separator disposed substantially near the top of the water-cooled reactor chamber; returning the separated solid particles in combustion to the reactor chamber by a water-cooled recycling means; and removing thermal energy from the integral system, i.e., reactor chamber, particle separator, and re-injection unit, by disposing heat exchange means substantially throughout the reactor chamber, whereby water contained within the heat exchange means is heated to produce steam. The particle separator, as described above, is formed by a first wall and a second wall of at least one sidewall of the reactor chamber and has a serpentine configuration.

Other and further objects, advantages and features of the present invention will be understood by reference to the following specification in conjunction with the annexed drawings, wherein like parts have been given like numbers.

DESCRIPTION OF THE PREFERRED EMBODIMENTS

This is a unique design for circulating fluidized bed boiler systems which integrates the fluidized bed combustor, solids or particle separator and the circulating bed reinjection unit into a single water-cooled system. This integral system preferably includes parallel membrane water-cooled rear sidewalls of the combustor. These sidewalls are used to channel the fluid bed flow or flue gas evenly across the width of the boiler, controlling velocity and allowing the stratification of the moving particles. The upper part of the parallel sidewalls are fabricated into a reverse S-shaped conduit which forces the fluid bed flow to make two 180 degree bends or turns.

Centrifugal force and gravity cause the flue gas to travel up through a stratified laminar flow of solids which results from the two turns in the particle separator. That is, the finer particles are mostly trapped and carried along by the larger particles which act as a filtration device as the flue gas permeates up through the particles. This unique stratification of the larger particles to act as a filtering means helps to increase the particulate capture at the point where flue gas is discharged from the particulate separator.

The concentrated recycled bed solids continue to flow down the channel formed by the parallel rear sidewalls into one or more solids chutes due to momentum and gravity. The solids chutes are also preferably formed by the parallel rear sidewalls. Thereafter, the solids are passed onto a solids re-injection means for recycling back to the reactor chamber.

Back-pass convection superheater and economizer sections may also be incorporated into and formed by the water-cooled membrane enclosure of the reactor chamber, thus, providing one uniformly expanding singularly supported piece of equipment.

Figure 1:
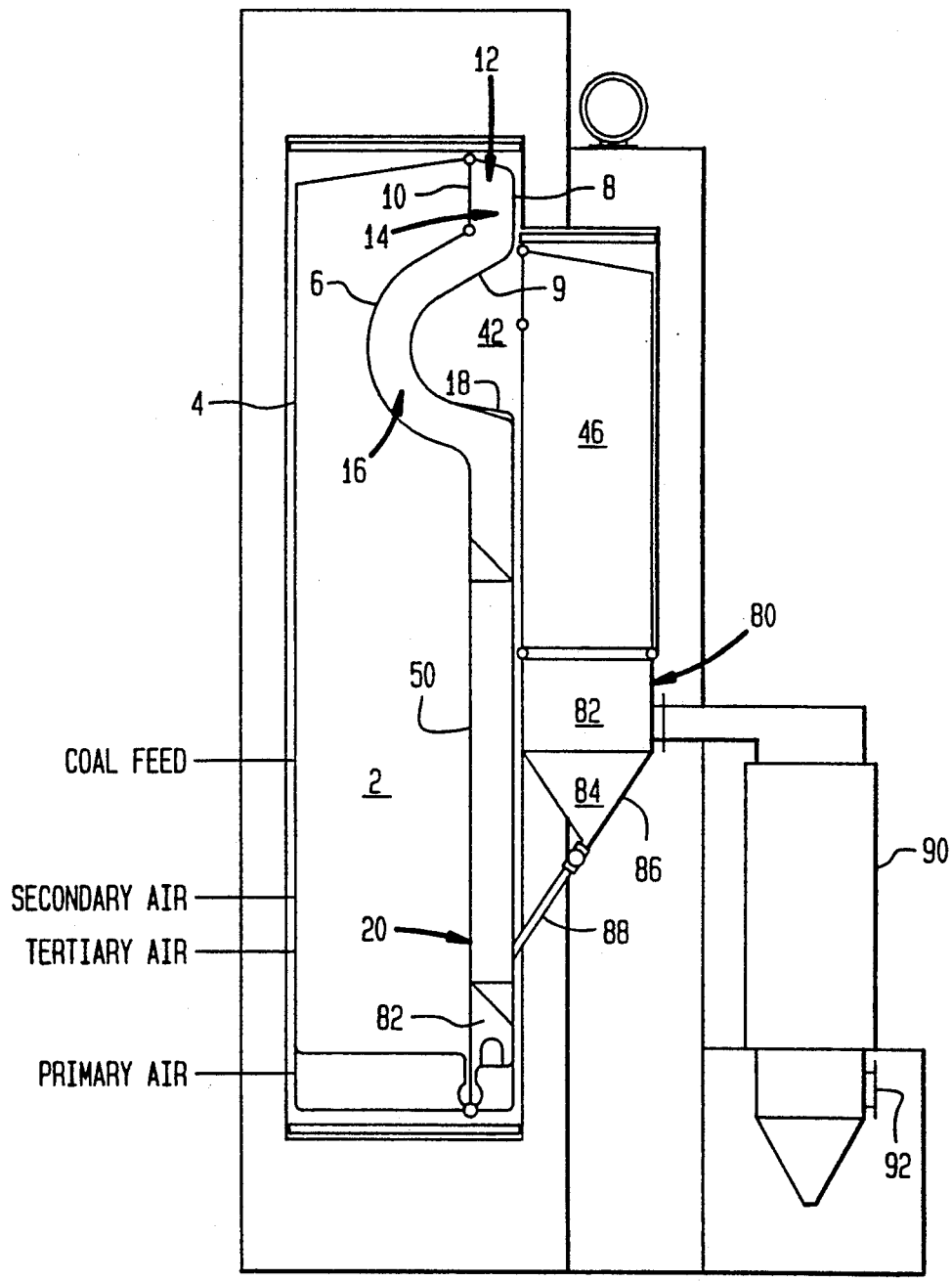
FIG. 1 is a schematic representation of an integral circulating fluidized bed boiler system having a serpentine particle separator formed from the sidewalls of the reactor chamber according to the present invention.

The present invention ca best be described by referring to the attached drawings, wherein FIG. 1 demonstrates a circulating fluidized bed boiler system which has been modified to include a particle separator formed by the rear sidewalls of the combustor. This integral circulating fluidized bed steam generator system comprises a reactor chamber 2, heat exchange means 4 for the circulation of a coolant disposed substantially throughout reactor chamber 2, wherein at least a portion of reactor chamber 2 includes at least one sidewall formed by a first wall 6 and a second wall 8, a first discharge conduit 10 disposed near the top of reactor chamber 2 for the discharge of flue gas having entrained solid particles, and a particle separator 12 connected to first discharge conduit 10 for separating the solid particles entrained within the discharged flue gas.

Particle separator 12 is formed by first and second walls (6,8) and has a serpentine configuration. This serpentine configuration preferably includes a first turn 14 and a second turn 16. This system also includes a means 20 for recycling the solid particles from particle separator 12 to reactor chamber 2.

Second discharge conduit 18 is preferably disposed about second wall 8 downstream of second turn 16. This permits the stratified flow of larger particles to move between a definite separation line and first wall 6 such that it acts as a filter to the flue gas as it passes therethrough to second discharge conduit 18.

Figure 2:
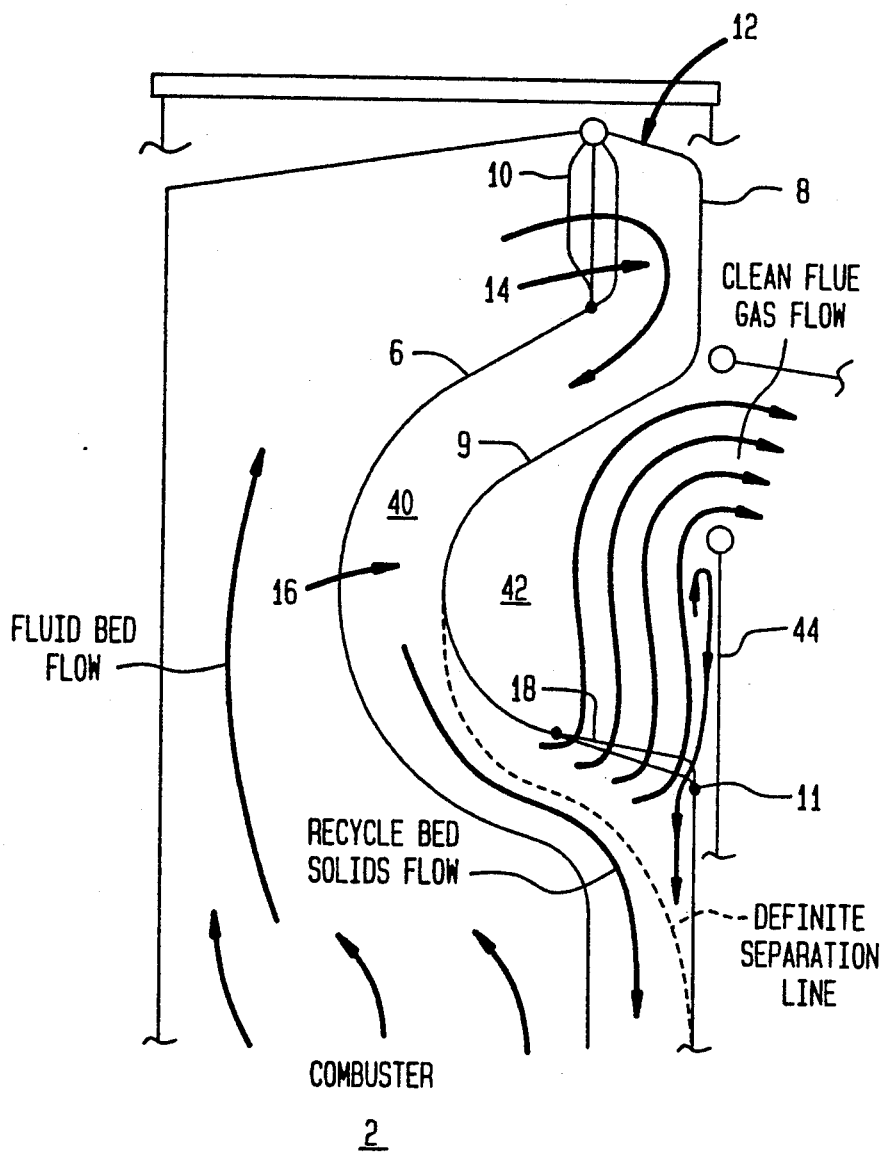
FIG. 2 is a schematic representation of the top portion of a reactor chamber having a serpentine particle separator and the flue ga flow lines in accordance with the present invention.

This is better exemplified in FIG. 2 which depicts the fluid bed flow (i.e., flue gas) pattern as it enters and travels through the serpentine or reverse S-shaped particle separator 12. First and second walls (6,8) of particle separator 12 are constructed from water-cooled membrane walls, i.e., heat exchange means, of reactor chamber 2. Walls (6,8) form a channel 40 which permits the passage of flue gas from reactor chamber 2 such that solids are collected and recycled to reactor chamber 2 via a reinjection means 20 and substantially solids free flue gas is exhausted via second discharge conduit 18.

Circulating fluidized bed boilers operate at extremely high velocities such that a substantial amount of solids are entrained within the flue gas as it travels up through reactor chamber 2. In order to conserve combustible material, the solids entrained within the upflowing flue gas are preferably collected and recycled back to the a lower section of the reactor chamber. Conventional means for accomplishing particle separation and recycle have been externally disposed cyclones and Fluo-Seals ® (a registered trademark of Dorr-Oliver Incorporated), respectively. Particle separator 12 of the present invention accomplishes the same function as the cyclone and FluoSeal ®, but at substantially reduced construction and maintenance costs.

The unique design of particle separator 12 provides for it to be disposed directly within the sidewall of reactor chamber 2 and make use of centrifugal and gravitational forces in order to separate flue gas from the entrained solids.

As the flue gas enters particle separator 12 via first discharge conduit 10 it immediately enters first turn 14 where the flue gas makes a 180 degree turn under turbulent flow. First turn 14 causes the larger particles entrained within the flue gas to be thrown toward outer rear wall 8 where they flow down the roof portion 9 of outer rear wall 8. Simultaneously, the flue gas flow will become a stratified laminar flow at a constant velocity.

Second turn 16 is also 180 degree and is done with a larger radius than first turn 14 so as not to effect the laminar flow. Second turn 16 switches the position of the stratified material, whereby the larger particles are moved to below the definite separation line with the finer particles and the flue gas sandwiched between inner rear wall 6 and the larger particles. The larger particles, finer particles and flue gas are all moving at a constant velocity. The centrifugal and gravitational forces cause the flue gas to travel up through the solids and enter the area above the definite separation line. The finer particles are mostly trapped and carried alone by the larger particles which acts as a filter to the flue gas permeating therethrough.

Above the definite separation line, outer rear wall 8 forms a corner 11 causing a stagnation point along the width of the system. Clean flue gas is drawn off above stagnation point 11 from channel 40 and enters a vertical flow reduced velocity cavity 42. Due to the reduced flow velocity in cavity 42 and gravity, additional fines drop out and have a tendency to travel toward the front wall 44 of superheater/economizer unit 46 and fall back down into the recycle bed solids flow (as shown by the directional arrows within FIG. 2).

Particle separator 12 is connected to means 20 for recycling the solid particles to reactor chamber 2 by means of a chute 50 formed by first and second walls (6,8) downstream of second turn 16. Means 20 for recycling the solid particles comprises at least one chute 50 connected to particle separator 12 downstream of second discharge conduit 18 and at least one re-injection means 52.

Figure 3:
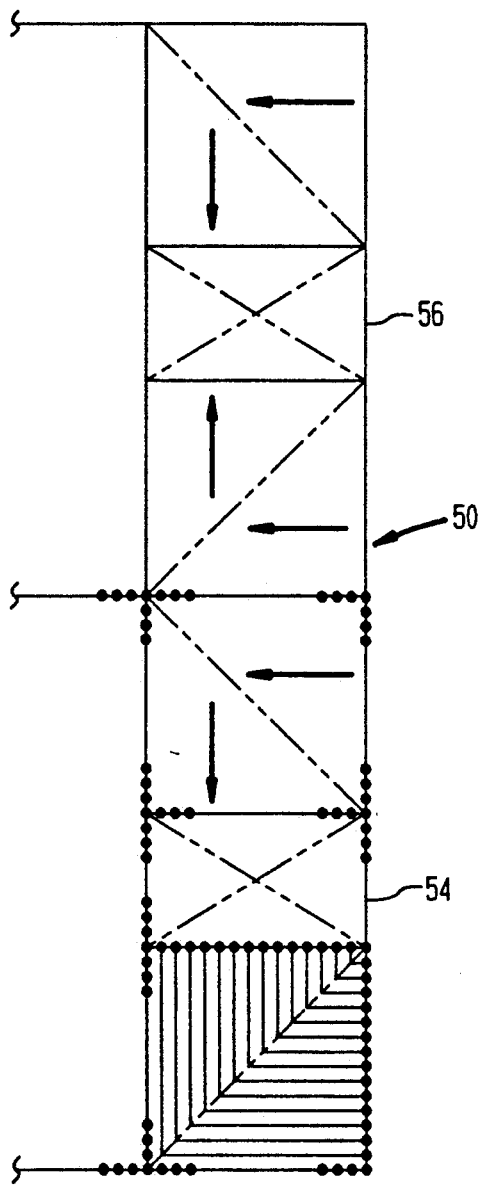
FIG. 3 is a schematic representation of a cross-sectional view of a chute of the recycling means connected to the particle separator.

As shown in FIGS. 3, each chute 50 comprises at least one primary compartment or chute (not shown) in its upper region and at least two secondary compartments or chutes 54 and 56 in its lower region. The primary compartment is in direct communication with each secondary compartment (54,56) and preferably a hopper configuration.

Figure 4:
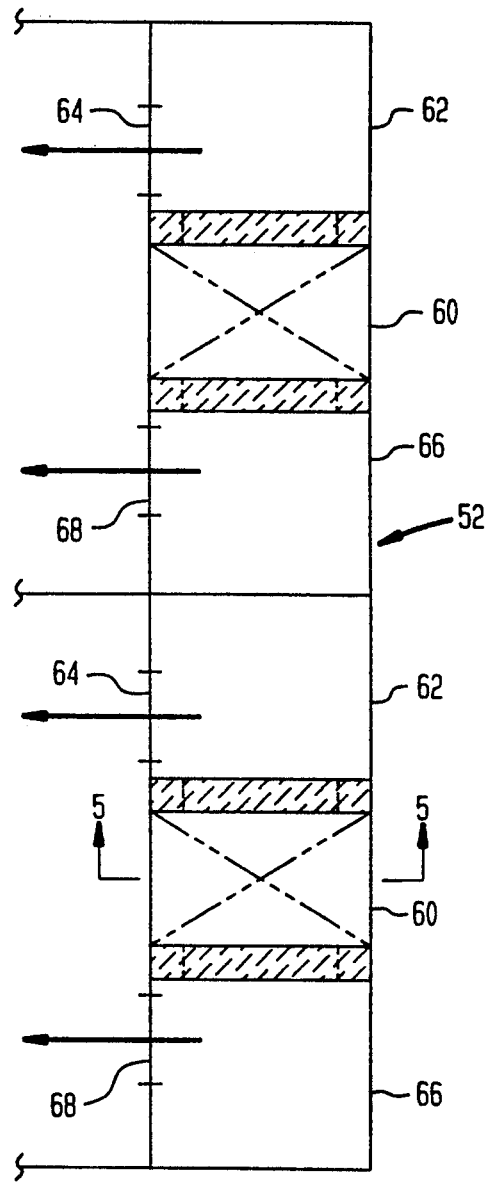
FIG. 4 is a schematic representation of a cross-sectional view of the solids re-injection means according to the present invention.
Figure 5:
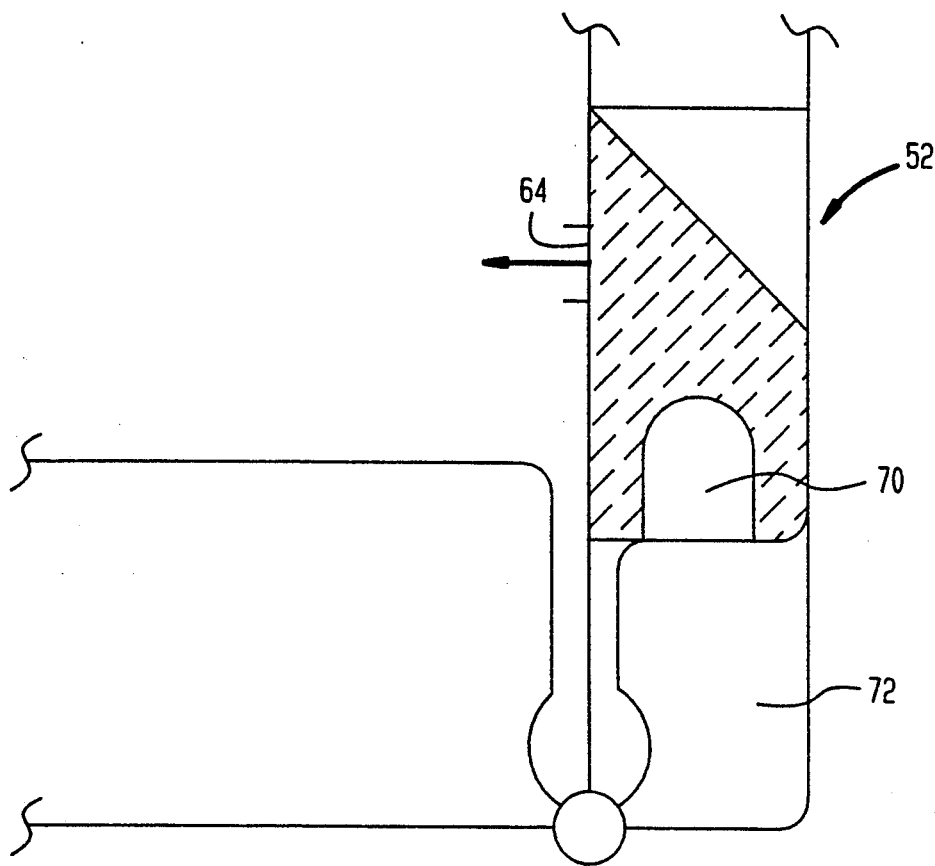
FIG. 5 is a cross-sectional view along line 5-5 of FIG. 4 depicting the brick partition wall, conduits between reinjection compartments and fluidizing air means.

FIGS. 4 and 5 depict the preferred re-injection means 52 which is connected to each secondary compartment (54,56) of chute 50. Re-injection means 52 is divided into three chambers by brick partitions. A center chamber 60 which is in direct communication with a secondary compartment of chute 50. A first outer chamber 62 having a first re injection discharge conduit 64 disposed between first outer chamber 62 and reactor chamber 2. A second outer chamber 66 having a second re-injection discharge conduit 68 disposed between second outer chamber 66 and reactor chamber 2. Center chamber 60 is connected with first outer chamber 62 by means of a first conduit 70 and with second outer chamber 66 by means of a second conduit (not shown). Re-injection means 52 also includes a means 72 for fluidizing solid particles contained therein such that the solid particles move from center chamber 60 through first and second conduits (70) to first and second outer chambers (62,66), respectively, and then from first and second outer chambers (62,66) through first and second re-injection discharge conduits (64,68), respectively, to reactor chamber 2.

As shown in FIG. 1, the system according to the present invention can also be adapted such that a superheater/economizer unit 46 is in communication with a cavity 42 and second discharge conduit 18, and formed from heat exchange means 4 of reactor chamber 2, thereby providing a uniformly expanding integral system.

Additionally, the system can include a means 80 for recycling secondary solid particles collected from superheater/economizer unit 46 back to reactor chamber 2. It is more preferable that the solids from means 80 be recycled to solids chute 50. Means 8 for recycling secondary solid particles comprises a secondary solids separation means 82 and a collection means 84. Collection means 84 is typically a hopper 86 which is connected to chute 50 via conduit 88.

Also, at least one air heater means 90 can be connected to secondary solids separation section 82, whereby cleaned flue gas is exhausted via port 92.

This circulating fluidized bed boiler system also preferably includes a means for introducing a carbonaceous material to a lower portion of the reactor chamber, a primary inlet means for introducing a fluidizing gas disposed at the bottom of the reactor chamber, and a secondary inlet means for introducing a fluidizing gas disposed above the means for recycling the solid particles from the particle separator. This system may also comprise a third inlet means for introducing a fluidizing gas which is disposed below the secondary inlet means.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. An integral circulating fluidized bed steam generation system comprising:
    a reactor chamber;
    heat exchange means for the circulation of a coolant disposed substantially throughout said reactor chamber, wherein at least a portion of said reactor chamber includes at least one sidewall formed by a first wall and a second wall;
    a first discharge conduit disposed near the top of said reactor chamber for the discharge of flue gas having entrained solid particles; and
    a particle separator connected to said first discharge conduit for separating the solid particles entrained within the discharged flue gas, said particle separator is formed by said first and second walls and has a serpentine configuration, wherein the serpentine configuration includes at least a first turn which is capable of causing said solid particles in the discharged flue gas to move toward said second wall and a second turn which is capable of causing smaller sized solid particles and the discharged flue ga to be disposed between said first wall and the large sized solid particles wherein said flue gas passes through said solid particles to a second discharge conduit which is disposed within said second wall and wherein a substantial portion of said smaller sized solid particles are retained between said first wall and the larger sized solid particles; and
    means for recycling said solid particles from said particle separator to said reactor chamber.

2. The system according to claim 1 wherein said first and second walls are formed from heat exchange means.

3. The system according to claim 1 wherein said second discharge conduit is disposed about said second wall downstream of said second turn.

4. The system according to claim 1 wherein said particle separator is connected to the means for recycling said solid particles to said reactor chamber by means of a conduit formed by said first and second walls downstream of said second turn.

5. The system according to claim 1 wherein said means for recycling said solid particles comprises at least one chute connected to said particle separator downstream of said second discharge conduit and at least one re-injection means.

6. The system according to claim 5 wherein each chute comprises at least two secondary compartments in its lower region.

7. The system according to claim 6 wherein said reinjection means comprises:
    a center chamber which is in communication with said secondary compartments of said chute;
    a first outer chamber having a first re-injection discharge conduit disposed between said first outer chamber and said reactor chamber;
    a second outer chamber having a second reinjection discharge conduit disposed between said second outer chamber and said reactor chamber;

a first conduit disposed between said center chamber and said first outer chamber;

a second conduit disposed between said center chamber and said second outer chamber; and a means for fluidizing said solid particles in said re-injection means such that said solid particles move from said inner chamber through said first and second conduits to said first and second outer chambers, respectively, and then from said first and second outer chambers through said first and second re-injection discharge conduits, respectively, to said reactor chamber.

8. The system according to claim 6 wherein said primary compartment is a hopper.

9. The system according to claim 1 wherein the smaller sized solid particles are retained between said first wall and the larger sized solid particles due to the stratification of said large solid particles near said second discharge conduit which is caused by gravity, centrifugal forces and said second turn.

10. The system according to claim 1 further comprising a discharge chamber in communication with aid second discharge conduit, said discharge chamber is capable of reducing the velocity of said discharged flue gas wherein additional fines are recycled to said particle separator.

11. The system according to claim 1 further comprising a superheater/economizer unit in communication with aid second discharge conduit.

12. The system according to claim 11 wherein said superheater/economizer unit si formed from said heat exchange means of said reactor chamber, thereby providing a uniformly expanding integral system.

13. The system according to claim 11 further comprising a means for recycling secondary solid particles collected from said superheater/economizer unit to said particle separator.

14. The system according to claim 13 wherein said means for recycling said secondary solid particles comprises a secondary solid particle separation means and a collection means.

15. The system according to claim 14 further comprising at least one air heater means in communication with said secondary solid particle separation means.

16. The system according to claim 1 further comprising:

a means for introducing a carbonaceous material to a lower portion of said reactor chamber;

a primary inlet means for introducing a fluidizing gas disposed at the bottom of said reactor chamber; and a secondary inlet means for introducing a fluidizing gas disposed above said means for recycling said solid particles from said particle separator.

17. The system according to claim 16 further comprising a third inlet means for introducing a fluidizing gas which is disposed below said secondary inlet means.

18. A process for burning carbonaceous material to generate steam which comprises the following steps:

introducing carbonaceous material to a lower portion of a fluid bed reactor chamber; primary fluidizing gas introduced at the bottom said reactor chamber and a secondary gas introduced into said reactor chamber at a level above said primary fluidizing gas;

burning said carbonaceous material in said reactor chamber;

removing thermal energy from said reactor chamber by disposing heat exchange means substantially throughout said reactor chamber, whereby water contained within said heat exchange means is heated to produce steam;

discharging flue gas with entrained solid particles to a particle separator disposed substantially near the top of said reactor chamber, said particle separator is formed by a first wall and a second wall of at least one sidewall of said reactor chamber and has a serpentine configuration, wherein the serpentine configuration includes at least a first turn which is capable of causing said solid particles in the discharged flue gas to move toward said second wall and a second turn capable of causing the smaller sized solid particles and the discharged flue gas to be disposed between said first wall and the larger sized solid particles wherein said flue gas passes through said solid particles to a second discharge conduit which is disposed within said second wall and wherein the smaller sized solid particles are retained between said first wall and larger sized solid particles;

returning the separated solid particles to said reactor chamber by a recycling means.

19. The process according to claim 18 wherein said first and second walls are formed from heat exchange means.

20. The process according to claim 18 wherein said second discharge conduit is positioned about said second wall downstream of said second turn.

21. The process according to claim 18 wherein said particle separator is connected to said recycling means by means of a conduit formed by said first and second walls downstream of said second turn.

22. The process according to claim 18 wherein said recycling means comprises at least one chute connected to said particle separator downstream of said second discharge conduit and at least one re-injection means.

23. The process according to claim 18 wherein each chute comprises at least two secondary compartments in its lower region.

24. The process according to claim 23 wherein said reinjection means comprises:

a center chamber which is in communication said secondary compartments of said chute;

a first outer chamber having a first re-injection discharge conduit disposed between said first outer chamber and said reactor chamber;

a second outer chamber having a second reinjection discharge conduit disposed between said second outer chamber and said reactor chamber;

a first conduit disposed between said center chamber and said first outer chamber;

a second conduit disposed between said center chamber and said second outer chamber; and a means for fluidizing said solid particles in said re-injection means such that said solid particles move from said inner chamber through said first and second conduits to said first and second outer chambers, respectively, and then from said first and second outer chambers through said first and second re-injection discharge conduits, respectively, to said reactor chamber.

25. The process according to claim 23 wherein said primary compartment is a hopper.

26. The process according to claim 18 wherein the smaller sized solid particles are retained between said first wall and the larger sized solid particles due to the stratification of said larger sized solid particles near said second discharge conduit which is caused by gravity, centrifugal forces and said second turn.

27. The process according to claim 18 further comprising the step of returning fines contained within said flue gas discharged via said second discharge conduit by means of a discharge chamber which is in communication with said second discharge conduit, said discharge chamber is capable of reducing the velocity of said discharged flue gas wherein additional fines are recycled to said particle separator.

28. The process according to claim 18 further comprising the step of passing said flue gas which is discharged from said second discharge conduit through a superheater/economizer unit.

29. The process according to claim 28 wherein said superheater/economizer unit is formed from said heat exchange means of said reactor chamber, thereby providing a uniformly expanding integral process.

30. The process according to claim 28 further comprising the step of recycling secondary solid said particle separator.

31. The process according to claim 30 wherein said secondary solid particles are recycled to said particle separator a secondary solid particle separation means and a collection means.

32. The process according to claim 31 further comprising the step of passing said flue gas from said secondary solid particle separator to at least one air heater means.

* * * * *